United States Patent [19]

Grob

[11] Patent Number: 4,945,783
[45] Date of Patent: Aug. 7, 1990

[54] RING GEAR WITH ROLL FORMED TEETH

[75] Inventor: Benjamin Grob, Cedarburg, Wis.

[73] Assignee: Grob, Inc., Grafton, Wis.

[21] Appl. No.: 322,094

[22] Filed: Mar. 9, 1989

[51] Int. Cl.$^5$ .............................................. B21H 5/00
[52] U.S. Cl. .................................... 74/460; 29/893.3; 72/68
[58] Field of Search .................... 72/68, 84; 29/159.2; 74/434, 460

[56] References Cited

U.S. PATENT DOCUMENTS

| | | |
|---|---|---|
| 3,745,851 | 7/1973 | Zeldman et al. |
| 3,796,085 | 3/1974 | Fisher et al. |
| 4,116,032 | 9/1978 | Krapfenbauer et al. ............... 72/68 |
| 4,132,098 | 1/1979 | Culver et al. |

FOREIGN PATENT DOCUMENTS

| | | | |
|---|---|---|---|
| 821451 | 11/1951 | Fed. Rep. of Germany | 74/460 |
| 3311528 | 10/1983 | Fed. Rep. of Germany | 29/159.2 |
| 3712123 | 2/1988 | Fed. Rep. of Germany | 29/159.2 |
| 84846 | 4/1987 | Japan | 72/68 |

Primary Examiner—Lowell A. Larson
Attorney, Agent, or Firm—Andrus, Sceales, Starke & Sawall

[57] ABSTRACT

A cold-formed ring gear is made from a relatively thin circular metal body, the outer peripheral edge of which is preformed to define a radially inwardly opening U-shaped channel in the outer surface of which the gear tooth pattern is subsequentially cold rolled using a known method and tooling. The unique preformed plate body obviates the need for a grooved interior supporting mandrel and results in a toothed rim of substantially enhanced strength and rigidity. The gear tooth pattern which is cold rolled in the preform provides tooth faces of substantially enhanced width and depth relative to the width and thickness of the base material from which they are formed. All of the other known advantages of cold formed teeth, as opposed to conventional cut teeth, are also realized.

9 Claims, 2 Drawing Sheets

RING GEAR WITH ROLL FORMED TEETH

BACKGROUND OF THE INVENTION

The present invention relates to a metal ring gear having roll formed teeth and to a method of making such a gear.

Metal sprockets and gears are manufactured by many different methods. Thus, metal gears may be cast and appropriately finished, cut from metal blanks utilizing gear hobbing equipment or the like, drawn from plate material in a die, or cold formed using various rolling tools and methods. Cold rolled gears are known to possess certain advantages over cut gears, such as eliminating waste chip material, providing uniform work hardening of the teeth during formation, and providing high tolerance and a good surface finish.

U.S. Pat. No. 3,745,851 shows a toothed gear or sprocket formed from a flat circular disc on which a peripheral tooth pattern is formed by rotating the disc between a pair of diametrically opposed rotating forming tools. The disc and the two oppositely disposed forming tools all rotate on parallel axes. Although the formed teeth are widened somewhat from the thin body of the disc in forming, the amount of material available and thus the axial width of the teeth are limited. U.S. Pat. No. 4,132,098 shows a similar process for cold rolling gears utilizing a single gear forming roll which rotates with the blank relative to its peripheral edge to cold form the tooth pattern therein. To provide a wide tooth face, suitable wide gear blanks are utilized.

In some applications, it is desirable to provide a gear having a relatively thin disc-shaped body and a substantially wider axial tooth pattern on its peripheral edge. For example, a starting ring gear for an automotive engine desirably has a substantially flat thin disc-shaped body, just sufficient to provide the necessary strength and rigidity while preserving a light weight, and having a peripheral tooth pattern in which the teeth have a substantially wider axial dimension. Such gears are typically formed from castings or forgings made with an axially widened peripheral edge into which the tooth pattern is subsequently cut with conventional gear cutting equipment. Such gears, however, bear the disadvantages which are attendent cut gears generally, as discussed above.

A ring gear might also be made by drawing a circular metal disc into a cup shape to form an axially extending cylindrical peripheral flange and forming a tooth pattern on the outer flange surface. The tooth pattern might be cut or cold formed by drawing, the latter in accordance with a method generally shown in U.S. Pat. 3,796,085. Teeth may also be cold formed in the axially extending outer cylindrical flange by the use of a known cold rolling method in which a gear forming roller or rollers are advanced incrementally in an axial direction across the surface of the flange sequentially with circumferential indexing around the flange. However, utilizing a gear blank in which the cylindrical outer flange is drawn from the blank or comprises a separate cylindrical ring welded to the outer edge of a flat disc presents inherent strength limitations and/or involves costly and time consuming fabricating steps. Also, the use of prior art roll forming methods requires the ID of the cylindrical flange to be supported on a grooved or splined mandrel of the same diameter. In addition, the depth and, therefore, the strength of the tooth pattern formed in the cylindrical outer ring is limited.

It would be desirable, therefore, to be able to provide a cold rolled gear possessing all the benefits of a gear formed by known cold forming methods, yet having an overall strength and tooth pattern comparable to conventional cut gears.

SUMMARY OF THE INVENTION

The present invention is directed to a cold-formed ring gear and a method of manufacturing such a gear from a lightweight thin metal plate having a peripheral outer edge portion of enhanced section. Gear teeth are cold rolled in the outer edge portion using a rotary tool and transverse tooth rolling techniques.

In accordance with the method of the preferred embodiment, the outer peripheral edge of a generally flat circular plate is formed into a radially inwardly opening U-shaped channel with one leg of the U-shaped channel comprising an integral radial extension of the plate body and the other leg of the channel comprising a radially inwardly extending circular lip. The plate body is clamped axially leaving the radial outer surface of the U-shaped channel exposed. The inner edge of the circular lip forming one leg of the U-shaped channel is supported on a cylindrical mandrel, and gear teeth are cold rolled into the outer surface of the U-shaped channel by utilizing a rolling tool which is moved transversely across the outer surface in a direction perpendicular to the legs of the channel and the plate body.

The outer faces of the legs of the U-shaped channel are confined during the cold rolling step to prevent the legs from spreading in the direction of rolling. Preferably, the outer faces of the legs are confined by clamping the legs during the step of clamping the plate body and utilizing the same clamping member.

The gear teeth are rolled incrementally utilizing one known cold rolling technique. In particular, the cold rolling process comprises forming each gear tooth pattern by moving the rolling tool incrementally across the outer surface of the U-shaped channel and indexing the rolling tool circumferentially around the outer surface between incremental forming steps.

The initial step of forming the outer peripheral edge of the plate into the U-shaped channel is also preferably done by cold forming.

The gear formed by the cold rolling method of the present invention thus includes a metal plate having a generally flat circular body with a peripheral edge portion turned back to extend radially inwardly along the flat body to define an outer peripheral portion having a U-shaped cross section, preferably of generally uniform thickness. The pattern of gear teeth cold formed in the radial outer surface of the outer peripheral portion is characterized by having a tooth depth greater than the thickness of the material from which it is formed and a tooth width in an axial direction across the face thereof which is greater than the distance between the axial outer faces of the plate body and the lip.

DETAILED DESCRIPTION OF THE PREFERRED EMBODIMENT

Figures 1, 2:
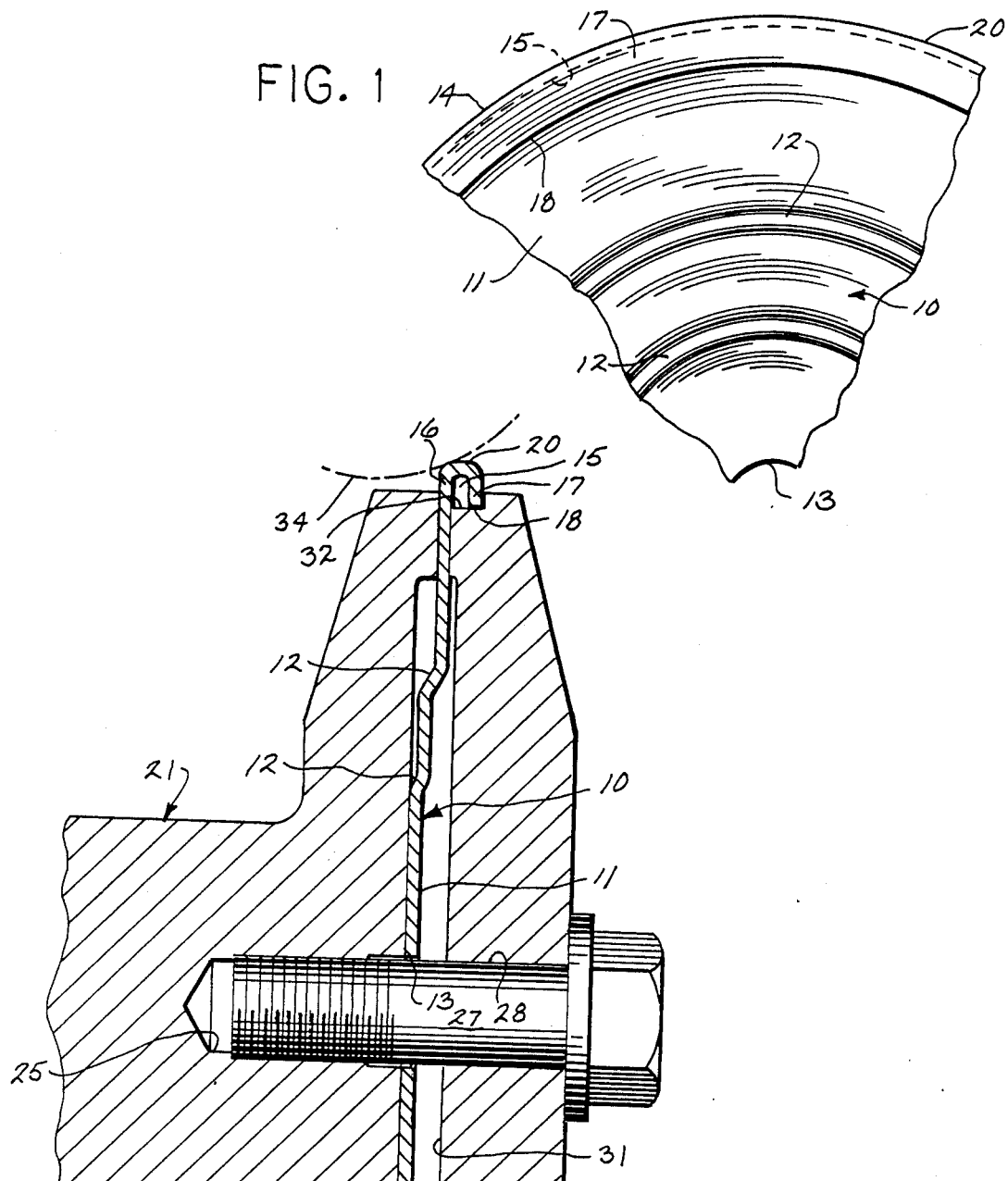
FIG. 1 is an axial view of a sector of a circular metal plate from which a gear of the present invention is formed, after the outer peripheral edge has been preformed, but before the gear teeth have been cold rolled thereon.
FIG. 2 is a radial section through the plate body shown in FIG. 1 additionally showing the clamping fixture for holding the plate body prior to cold rolling the teeth.

Referring particularly to FIGS. 1 and 2, a metal plate 10 is stamped or otherwise formed to provide a generally flat circular body 11. The body 11 may be appropriately dished as at 12 to enhance the rigidity of the plate or to conform to size and shape requirements of the engine on which the finished gear will be mounted. The circular body 11 has an axial center hole 13 and a specially preformed outer peripheral edge 14. The outer edge of the flat circular body is turned approximately 180° in a cold forming operation to form a channel 15 which is U-shaped in cross section and opens radially inwardly toward the center of the circular body 11. One leg 16 of the U-shaped channel 15 comprises an integral radial extension of the plate body 11 itself and the other leg 17 comprises a radially inwardly extending circular lip 18. The legs 16 and 17 of the U-shaped channel 15 are interconnected by an integral outer surface portion 20 which together defines a channel having a cross section of generally uniform thickness.

The circular plate body 11 with the preformed U-shaped channel 15 is clamped in a clamping fixture 21 to firmly support and secure it for the subsequent tooth forming operation. The circular plate body 11 is placed against a circular backing plate 22 which has a suitable recess 24 to accommodate the dished portions 12 of the plate body and a tapped axial bore 25. The plate body is supported against the backing plate 22 by an outer circular backing surface 26 and the center of the plate generally surrounding the axial hole 13 is supported against the bottom of the recess 24. A clamping plate 23 is placed against the other face of the circular body 11 to clamp the plate body against the backing plate 22 with a clamping bolt 27 extending through an axial through bore 28 in the clamping plate 3, the hole 13 in the body 11 and into threaded engagement in the tapped axial bore 25 in the backing plate. The clamping plate 23 includes a circular outer clamping surface 30 having a diameter approximately the same as the circular backing surface 26 of the backing plate 22 and cooperating therewith to securely clamp the plate body 11 therebetween. The center portion 31 of the interior of the clamping plate 23 may also be appropriately recessed so the clamping force is concentrated between the circular clamping and backing surfaces 30 and 26, respectively.

The outer edge of the clamping plate 23 is machined to define a cylindrical shoulder 32 and a circular abutment surface 33. The diameter of the cylindrical shoulder 32 is approximately the same as (just slightly smaller than) the diameter of the circle defined by the edge of the circular lip 18, such that the cylindrical shoulder 32 provides a supporting mandrel for the edge of the lip 18 when the plate body 11 is securely clamped in the clamping fixture 21. The length of the cylindrical shoulder 32 in the axial direction is just slightly larger than the distance between the outer surfaces of the legs 16 and 17, such that the plate body may be securely clamped without the abutment surface 33 engaging and bending the circular lip portion 18, but closely enough spaced thereto to prevent movement of the lip and spreading of the legs 16 and 17 as the teeth are formed in the following manner.

With the preformed plate body 11 securely clamped in the clamping fixture 21 and the circular lip 18 of the leg 17 supported on the cylindrical shoulder 32, as shown in FIG. 2, the gear teeth are cold rolled in the outer surface portion 20 of the U-shaped channel 15. The gear teeth are preferably rolled incrementally utilizing a rolling tool 34, shown in FIG. 5, of a type whose construction and operation are known in the art. In a known manner, the rolling tool 34 or pairs of rolling tools are mounted on a planetary rolling head (not shown) to engage and penetrate the outer surface portion 20 to form an incremental portion of the tooth pattern. The circular plate body 11 is indexed circumferentially with respect to the tool between incremental forming steps to present an adjacent surface for the formation of an incremental tooth pattern and the entire plate body mounted in the clamping fixture 21 is advanced axially with respect to the rolling tool 34 continuously with the incremental tooth pattern formation. Thus, the gear teeth 35 are rolled in a direction perpendicular to the legs 16 and 17 of the U-shaped channel 15 (i.e. parallel to the axis of the assembly).

Figure 3:
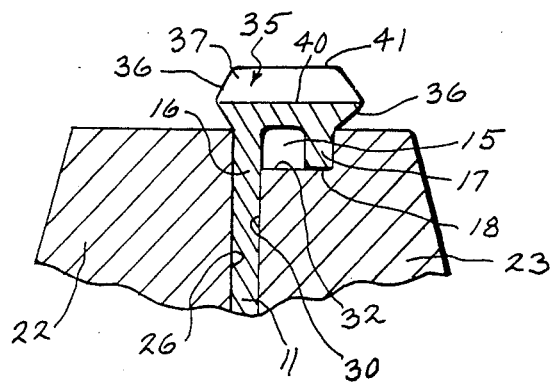
FIG. 3 is a partial radial section through the outer peripheral edge of the plate body and the clamping fixture after the gear teeth have been formed.
Figure 4:
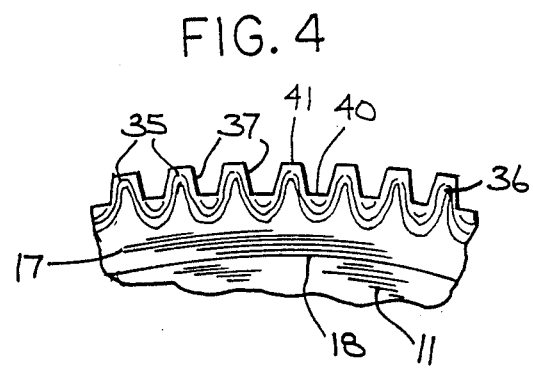
FIG. 4 is an axial view of a portion of the peripheral outer edge of the gear after the teeth have been formed.
Figure 5:
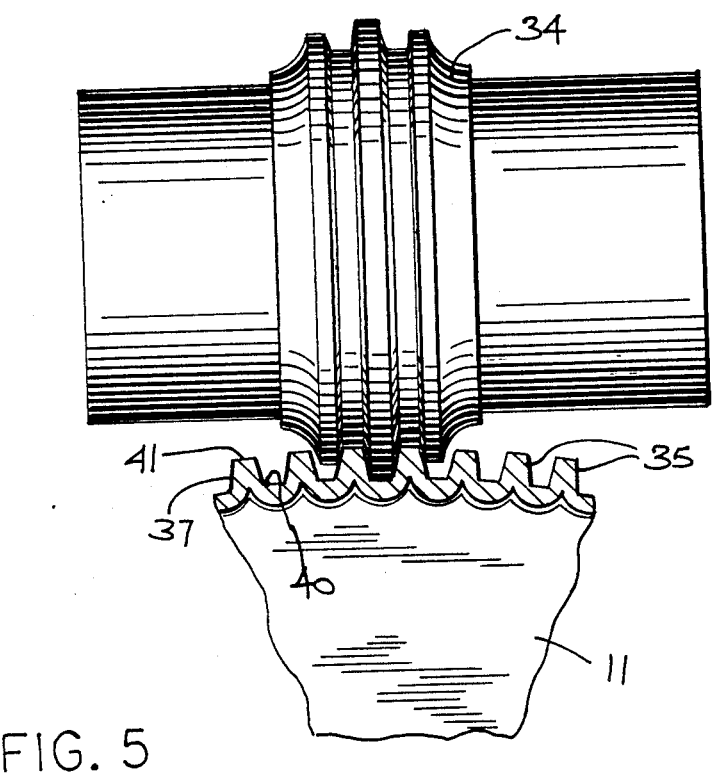
FIG. 5 is a view of the outer peripheral edge of the gear similar to FIG. 4, but in vertical section, and also showing the final position of the gear rolling tool in relation thereto.

Referring also to FIGS. 3–5, the rolling tool 34 has a working face which represents precisely the shape of the finished gear tooth pattern. The process obviously requires the use of a ductile material and the rolling tool 34 acts to spread the material axially and push the material radially into the channel 15. Thus, the maximum outside diameter of the gear, after the teeth 35 are formed, is smaller than the outside diameter of the circular plate body 11. As a result, the teeth 35 are formed with a depth substantially greater than the thickness of the material defining the outer U-shaped channel 15. As previously indicated, prior art methods required the use of a grooved or splined mandrel having a tooth pattern somewhat similar to the pattern of the rolling tool 34 to support the underside of the surface in which the tooth pattern is formed. The method of the present invention obviates the need for a grooved supporting mandrel and, instead, the surface in which the gear teeth are formed is supported by the engagement of the circular lip 18 on the cylindrical shoulder 32 of the clamping plate 23. Thus, referring to the radial section through the finished gear shown in FIG. 5, cold formed material on the inside of the U-shaped channel 15 between the legs 16 and 17 flows in a uniform generally wave-like pattern shown. However, because the legs 16 and 17 are rigidly supported against the radially imposed force of the rolling tool 34, the cold formed teeth 35 spread in the direction of formation to provide widened end portions 36. Thus, the width of a finished tooth face 37 is somewhat greater than the distance between the axial outer faces of the plate body 11 and circular lip 18 (i.e. the distance between the backing surface 26 of the backing plate 22 and the abutment surface 33 of the clamping plate 23).

As previously indicated, initial clamping of the plate body 11 in the clamping fixture 21 leaves an initial slight clearance 38 (exaggerated for clarity in FIG. 2) between the outer face of leg 17 and the abutment surface 33. Referring also to FIG. 3, this clearance 38 is closed and eliminated as a result of the tooth forming operation and, thus, both the cylindrical shoulder 32 and the abutment surface 33 support the circular lip 18 of the leg 17 during cold rolling of the gear teeth. This assures the maintenance of concentricity and close control of run out in the gear pitch diameter.

In addition to eliminating the need to use a grooved or splined supporting mandrel, formation of the gear tooth pattern in the uniquely formed U-shaped channel 15 provides an outer gear rim of enhanced strength. Also, referring particularly to FIG. 3, the flow of material during the cold rolling process results in a tooth depth (vertical distance between the root 40 and the crest 41 of the tooth) which is actually somewhat greater than the thickness of the material forming the outer surface portion 20 in which the tooth is formed. None of these foregoing benefits is, of course, available in a gear in which the teeth are cut or formed on a splined supporting mandrel. Overall, the method of the present invention allows the use of stock material with a section that would normally be too thin to produce a gear having the requisite strength and tooth face pattern.

Various modes of carrying out the present invention are contemplated as being within the scope of the following claims particularly pointing out and distinctly claiming the subject matter which is regarded as the invention.

I claim:

1. A method of manufacturing a ring gear from a metal plate having a generally flat circular body comprising the steps of:
   (1) forming the outer peripheral edge of the plate into a radially inwardly opening U-shaped channel one leg of which is defined by an integral radial extension of the plate body and the other leg of which is defined by a radially inwardly extending circular lip;
   (2) clamping the plate body axially to expose the radial outer surface of the U-shaped channel;
   (3) supporting the edge of the circular lip on a cylindrical mandrel; and,
   (4) cold rolling gear teeth in the outer surface of the U-shaped channel with a rolling tool moved across said outer surface in a direction perpendicular to the legs of the channel.

2. The method as set forth in claim 1 including the step of confining the outer faces of the legs of the channel during rolling to prevent the legs from spreading in the direction of rolling.

3. The method as set forth in claim 2 wherein the confining step comprises clamping the legs of the plate body.

4. The method as set forth in claim 2 wherein the gear teeth are rolled incrementally.

5. The method as set forth in claim 2 wherein the cold rolling step comprises:
   (1) forming each gear tooth pattern incrementally by moving the rolling tool across the surface; and,
   (2) indexing the rolling tool along the surface circumferentially of the plate body between incremental forming steps.

6. The method as set forth in claim 1 wherein said U-shape channel is cold formed.

7. A cold-formed ring gear comprising:
   a metal plate having a generally flat circular body;
   the circular peripheral edge of the plate formed with a lip turned back to extend radially inwardly of the plate body to define an outer peripheral portion having an inwardly opening U-shaped cross section of generally uniform thickness;
   a pattern of gear teeth cold-formed in the radial outer surface of the outer peripheral portion;
   said teeth characterized by plate material supporting said teeth in the area of the root diameter having a uniform thickness substantially equal to the thickness of the material forming the outer peripheral portion.

8. The gear as set forth in claim 7 wherein the outer peripheral portion of the plate is cold-formed.

9. The gear as set forth in claim 7 wherein said teeth are roll formed.

* * * * *